United States Patent
De Pauw et al.

(10) Patent No.: US 8,326,982 B2
(45) Date of Patent: *Dec. 4, 2012

(54) METHOD AND APPARATUS FOR EXTRACTING AND VISUALIZING EXECUTION PATTERNS FROM WEB SERVICES

(75) Inventors: Wim De Pauw, Scarborough, NY (US); Sophia Krasikov, Katonah, NY (US); Michelle Lei, Geneva (CH); John Morar, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/983,551

(22) Filed: Jan. 3, 2011

(65) Prior Publication Data

US 2011/0106944 A1    May 5, 2011

Related U.S. Application Data

(63) Continuation of application No. 12/164,726, filed on Jun. 30, 2008, now Pat. No. 7,873,728, and a continuation of application No. 11/274,383, filed on Nov. 15, 2005, now abandoned.

(60) Provisional application No. 60/628,302, filed on Nov. 15, 2004.

(51) Int. Cl.
*G06F 15/173* (2006.01)
(52) U.S. Cl. ...................................... 709/224; 709/223
(58) Field of Classification Search ................. 709/223, 709/224

See application file for complete search history.

(56) References Cited

U.S. PATENT DOCUMENTS

| | | | |
|---|---|---|---|
| 5,694,548 A | 12/1997 | Baugher et al. | |
| 5,850,338 A | 12/1998 | Fujishima | |
| 6,279,113 B1 * | 8/2001 | Vaidya | 726/23 |
| 6,430,617 B1 * | 8/2002 | Britt et al. | 709/224 |
| 6,438,579 B1 * | 8/2002 | Hosken | 709/203 |
| 6,643,613 B2 * | 11/2003 | McGee et al. | 702/186 |
| 6,891,838 B1 | 5/2005 | Petite et al. | |
| 7,039,639 B2 * | 5/2006 | Brezin et al. | 1/1 |
| 7,406,436 B1 * | 7/2008 | Reisman | 705/7.32 |
| 7,873,728 B2 | 1/2011 | De Pauw et al. | |
| 2002/0027504 A1 | 3/2002 | Davis et al. | |
| 2002/0062368 A1 * | 5/2002 | Holtzman et al. | 709/224 |
| 2003/0051059 A1 * | 3/2003 | Zondervan et al. | 709/250 |
| 2003/0061340 A1 | 3/2003 | Sun et al. | |
| 2003/0131097 A1 * | 7/2003 | Kasriel et al. | 709/224 |
| 2004/0015719 A1 | 1/2004 | Lee et al. | |
| 2004/0059807 A1 * | 3/2004 | Klotz et al. | 709/223 |
| 2004/0103371 A1 * | 5/2004 | Chen et al. | 715/513 |
| 2005/0102392 A1 * | 5/2005 | Bou-Ghannam et al. | 709/224 |
| 2005/0125271 A1 * | 6/2005 | Peltz | 705/7 |
| 2005/0154627 A1 * | 7/2005 | Zuzek et al. | 705/10 |
| 2005/0223021 A1 * | 10/2005 | Batra et al. | 707/102 |
| 2005/0243867 A1 | 11/2005 | Petite | |

* cited by examiner

*Primary Examiner* — David Lazaro
*Assistant Examiner* — Edward Kim
(74) *Attorney, Agent, or Firm* — Louis J. Percello (57) ABSTRACT

One embodiment of the present method and apparatus for extracting and visualizing execution patterns from Web Services collects data relating to one or more transactions executed in accordance with one or more Web Services-based applications (e.g., messaging systems or other services). One or more patterns is then extracted from the collected data, where the patterns are representative transactions commonly executed in accordance with the Web Services configuration under analysis.

18 Claims, 7 Drawing Sheets

FIG. 7

METHOD AND APPARATUS FOR EXTRACTING AND VISUALIZING EXECUTION PATTERNS FROM WEB SERVICES

CROSS REFERENCE TO RELATED APPLICATIONS

This application is a continuation of U.S. patent application Ser. No. 12/164,726, filed on Jun. 30, 2008 now U.S. Pat. No. 7,873,728, entitled "METHOD AND APPARATUS FOR EXTRACTING AND VISUALIZING EXECUTION PATTERNS FROM WEB SERVICES", which is currently and is a continuation of U.S. patent application Ser. No. 11/274,383, filed on Nov. 15, 2005 now abandoned, entitled "METHOD AND APPARATUS FOR EXTRACTING AND VISUALIZING EXECUTION PATTERNS FROM WEB SERVICES" (now abandoned), which claims the benefit of priority to U.S. Provisional Patent Application Ser. No. 60/628,302, filed Nov. 15, 2004 under 35 U.S.C. 119(e), where each of the above cited applications is herein incorporated by reference in its entirety.

FIELD OF THE INVENTION

The present invention relates generally to Web Services and relates more particularly to the performance analysis, debugging and program understanding of Web Services configurations.

BACKGROUND

Web Services applications are web-based enterprise applications that use open, extensible markup language (XML)-based standards and transport protocols to exchange data with calling clients. Using Web Services, developers can build distributed applications with an eye toward interoperability as the priority. Perhaps the most popular architectural approach to service-based infrastructures is organizing computational resources as a broad collection of individual services that can be flexibly combined into applications.

One of the challenges associated with such an approach is the management of horizontal complexity (e.g., because there are many nodes or computing devices in a Web Services framework, and many interconnections and overlapping applications). Tasks such as performance analysis, debugging and program understanding thus become more complex in a large Web Services configuration.

Thus, there is a need in the art for a method and apparatus for extracting and visualizing execution patterns from Web Services configurations.

SUMMARY OF THE INVENTION

One embodiment of the present method and apparatus for extracting and visualizing execution patterns from Web Services collects data relating to one or more transactions executed in accordance with one or more Web Services applications (e.g., a messaging system or other service). One or more patterns is then extracted from the collected data, said where the patterns are representative transactions commonly executed in accordance with the Web Services configuration under analysis.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Figure 1:
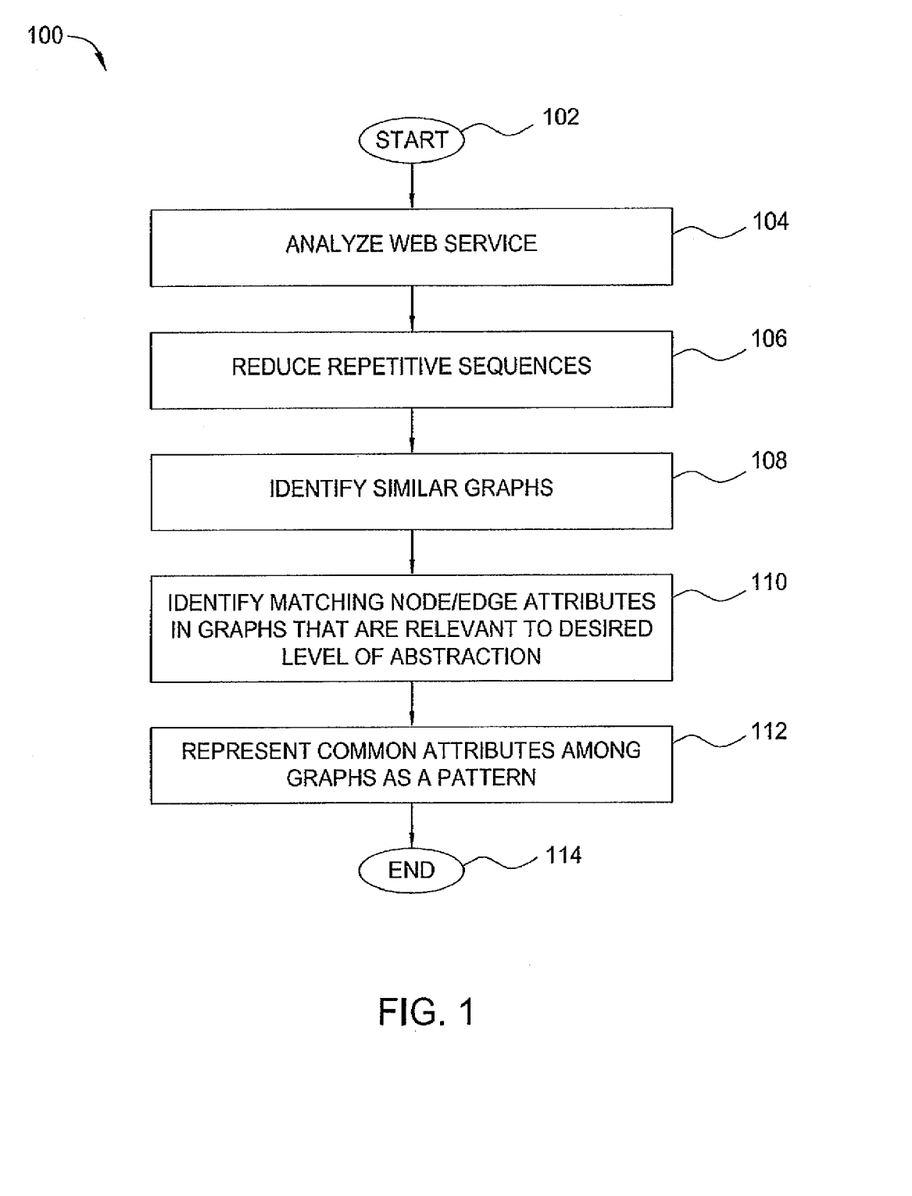
FIG. 1 is a flow diagram illustrating one embodiment of a method for extracting and visualizing execution patterns from a Web Services configuration, according to the present invention.

In one embodiment, the present invention is a method and apparatus for extracting and visualizing execution patterns from Web Services configurations. Embodiments of the present invention provide for the efficient identification and definition of patterns in Web Services transactions, which facilitates operations including performance analysis, debugging and program understanding by allowing a user to analyze and understand system conditions without having to review hundreds or thousands of sets of individual data FIG. 1 is a flow diagram illustrating one embodiment of a method 100 for extracting and visualizing execution patterns from a Web Services configuration, according to the present invention. The method 100 is initialized at step 102 and proceeds to step 104, where the method 100 analyzes the Web Services configuration. That is, the method 100 collects data relating to transactions (e.g., sets of units of work initiated by a user or a batch job) that are executed in accordance with the Web Service. For example, if the Web Services configuration is a messaging system, the method 100 may, in step 104, implement a tracing infrastructure in order to record a plurality of messages being sent, along with their associated identifications, timestamps, participants (e.g., service points, machine names, etc.) and attributes (e.g., content, style, etc.). In one embodiment, the tracing infrastructure enables end-to-end tracking of a transaction.

Once sufficient data has been collected, the method 100 proceeds to step 106 and reduces repetitive sequences in the collected data. For example, if the collected data includes a plurality of recorded messages from a messaging system, a sequence of messages within an individual transaction can be very repetitive, and this repetition can be detected so that the transaction can be described in a more "canonical" form. For instance, the sequences of messages:

-A->B->C->D->B->C->D->B->C->D->B->C->D->B->C->D->E

-A->B->C->D->B->C->D->B->C->D->E can be summarized as:

-A->[->B->C->D]*->E

In one embodiment, the messages are not necessarily identical in all respects (e.g., the messages may only be identical as far as the operation names are concerned).

Once the repetitive sequences have been reduced, the method 100 proceeds to step 108 and identifies isomorphic or similar graphs (e.g., trees) within the sequences. Since a Web Services transaction starts at one point (e.g., a client call) and goes through one or more services (possibly branching off), the structure of the transaction can be described or illustrated as a tree.

Figure 3:
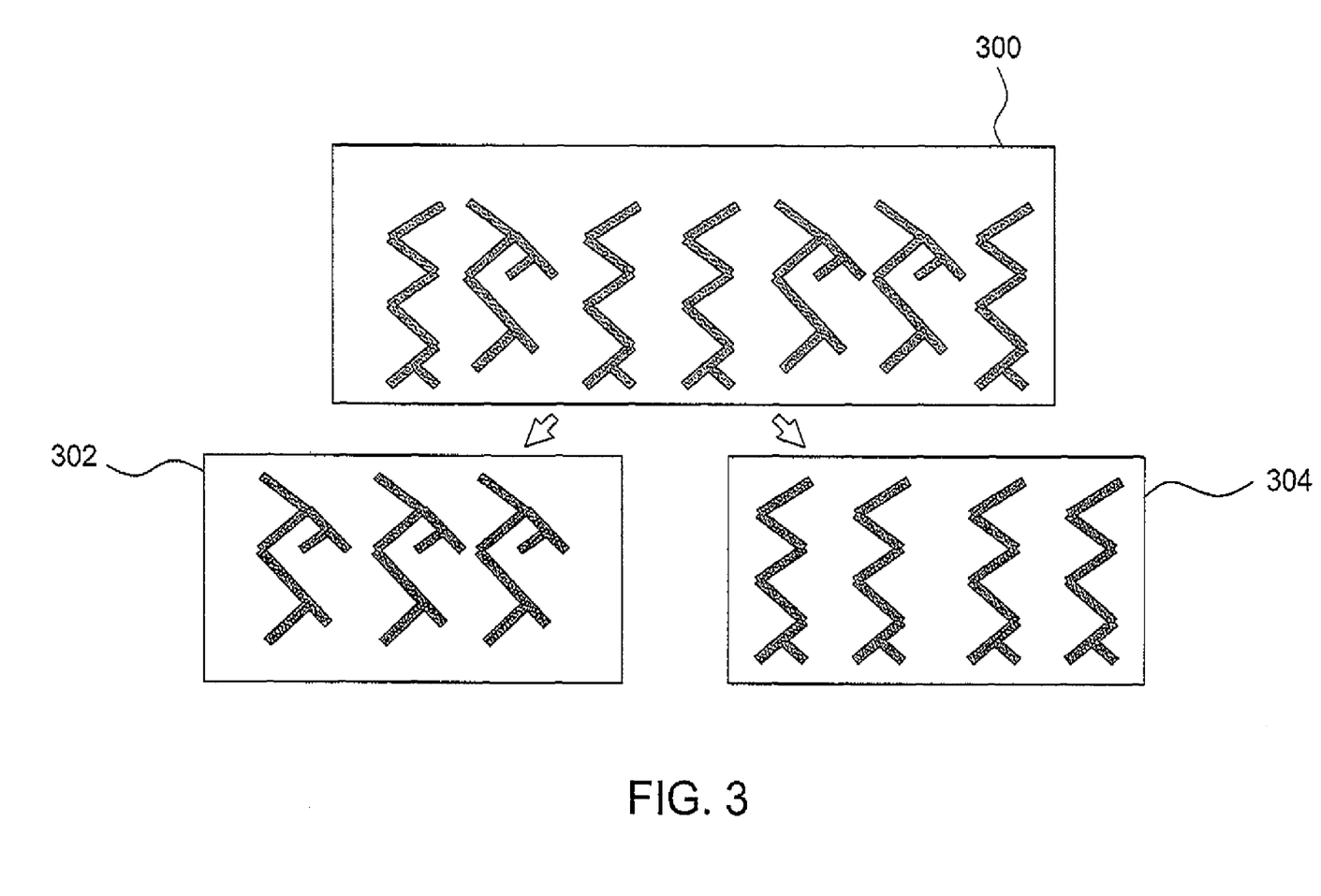
FIG. 3 illustrates a group of exemplary transactions represented as graphs or trees.

For example, FIG. 3 illustrates a group 300 of exemplary transactions represented as graphs or trees. In one embodiment, isomorphic or similar transactions are found by comparing the tree structures starting at the roots, where the roots are the transaction starting points (e.g., client calls). It can be seen by comparing the trees in this manner that several of the transactions illustrated in the group 300 are isomorphic with respect to other transactions in the group 300. Thus, the group 300 may be partitioned into a plurality of subgroups—in this case a first subgroup 302 and a second sub-group 304—where each sub-group comprises a sub-set of the original group of transactions that shares certain features or graphical elements.

Referring back to FIG. 1, once the isomorphic or similar graphs have been identified, the method 100 proceeds to step 110 and identifies matching node/edge attributes in the graphs that are relevant to a desired level of abstraction of the analysis, where a node is a service point (e.g., a Web Service endpoint) and an edge is an operation (e.g., what was sent in the message).

Most transactions will not be identical; however, many of the differences may seem overwhelming at first and may distract from more significant trends. Finding the commonalities may provide a better understanding of the typical behavior of the Web Services configuration under analysis. In one embodiment, attributes are deemed to match based on predefined criteria that define when transactions may be automatically considered as similar and classified into a common pattern. In another embodiment, matching of node or edge attributes may be performed in accordance with a matcher.

Thus, sub-groups of graphs, such as sub-groups 302 and 304 of FIG. 3, may be further partitioned into sub-sub-groups based on criteria such as node and/or edge attributes.

Figure 4:
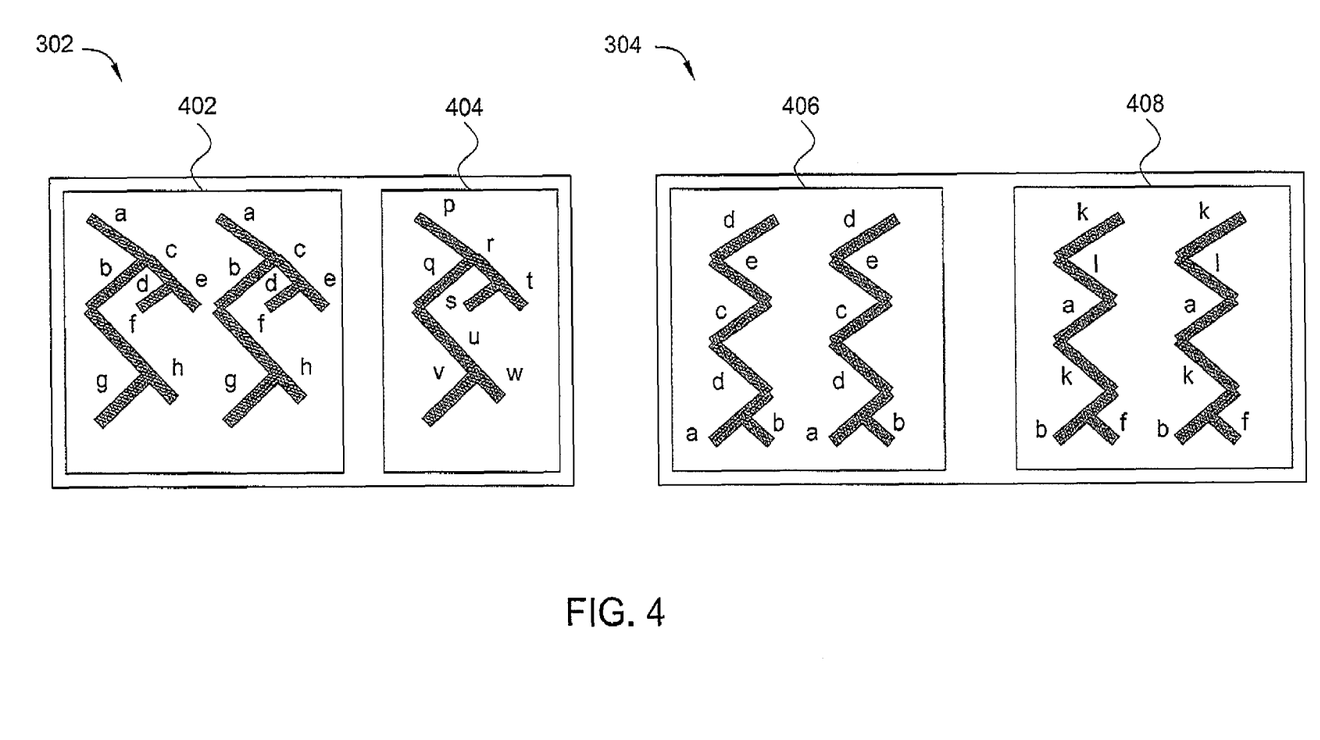
FIG. 4 illustrates the sub-groups of FIG. 3 partitioned into sub-sub-groups.

For example, FIG. 4 illustrates the sub-groups 302 and 304 of FIG. 3 partitioned into sub-sub-groups. Specifically, sub-group 302 is partitioned into sub-sub-group 402 and sub-sub-group 404; sub-group 304 has been partitioned into sub-sub-group 406 and sub-sub-group 408. In one embodiment, the sub-sub-groups 402, 404, 406 and 408 are defined based on graph isomorphism and on operation name as the matching criterion, where the operation names are illustrated by letters of the alphabet (e.g., a-b-c-d-e-f-g-h in the case of sub-sub-group 402, p-q-r-s-t-u-v-w in the case of sub-sub-group 404, etc.).

Matching criterion for sub-sub-groups may be based on node attributes, edge attributes, or both. In one embodiment, potentially relevant node attributes include, but are not limited to, service points, port types, machines, node performance data or any function thereof. In one embodiment, potentially relevant edge attributes include, but are not limited to, operations (e.g., business processes), message names (e.g., unique identifiers such as names, parameter types or return types), message types (e.g., synchronous or asynchronous, operation style, etc.), error types, performance data (for what is sent), message content or any function thereof. Thus, for example, identical operations between two transactions may reveal business processes across different deployments of the same business, while identical operations and service points may reveal business processes that are specific to a given deployment. Identical PortTypes may reveal typical patterns across different deployments of the same business, identical machines may reveal patterns in traffic between and workloads on machines (which may help in repartitioning the application across the machines in a different way), and identical service points may reveal traffic patterns between service points (which may help in repartitioning an application on several machines).

In further embodiments, matching criteria may require only a defined degree of similarity, and not a perfect identical match. In such a case, wildcards may be implemented. For example, sendClientOrder calling sendRetailOrder calling send WarehouseAOrder calling sendManufacturerXOrder calling and sendClientOrder calling sendRetailOrder calling send WarehouseBOrder calling sendManufacturerYOrder calling is substantially equivalent to:

sendClientOrder calling sendRetailOrder calling sendWarehouse*Order calling sendManufacturer*Order calling In one embodiment, the content of two or more pieces of data (e.g., two or more messages) is matched against each other according to different criteria. For example, many messaging systems use message content that is structured, meaning the message contents have parameter types (or tags) and parameter values. In the case of Web Services, message content is typically represented in Simple Object Access Protocol (SOAP), which contains tag and value fields. Given this, a match between messages can be based on the parameter types (tag fields), on the value fields, or on both. The information that is used to match corresponding nodes could also be found outside the system. For example, two nodes could be matched based on port type, in accordance with the Web Services Description Language (WSDL) resource for the associated application.

In yet another embodiment, the matching criteria could be discovered automatically (e.g., instead of being based on pre-defined or user-defined criteria). For example, automatic discovery of matching criteria might involve first identifying which nodes, edges or attributes share common values.

Referring back to FIG. 1, once transactions are partitioned into sub-groups and sub-sub-groups of matching transactions (based on the same or similar attributes), the method 100 proceeds to step 112 and represents (or "visualizes") the partitioned sub-sub-groups as patterns. The method 100 then terminates in step 114.

Thus, the present invention allows patterns in Web Services transactions to be efficiently identified. Efficient identification of transaction patterns facilitates operations including performance analysis, debugging and program understanding by allowing a user to analyze and understand system conditions without having to review hundreds or thousands of sets of individual data. Common trends, abnormalities and outliers can thus be easily summarized in accordance with various different levels of abstraction.

Figure 2:
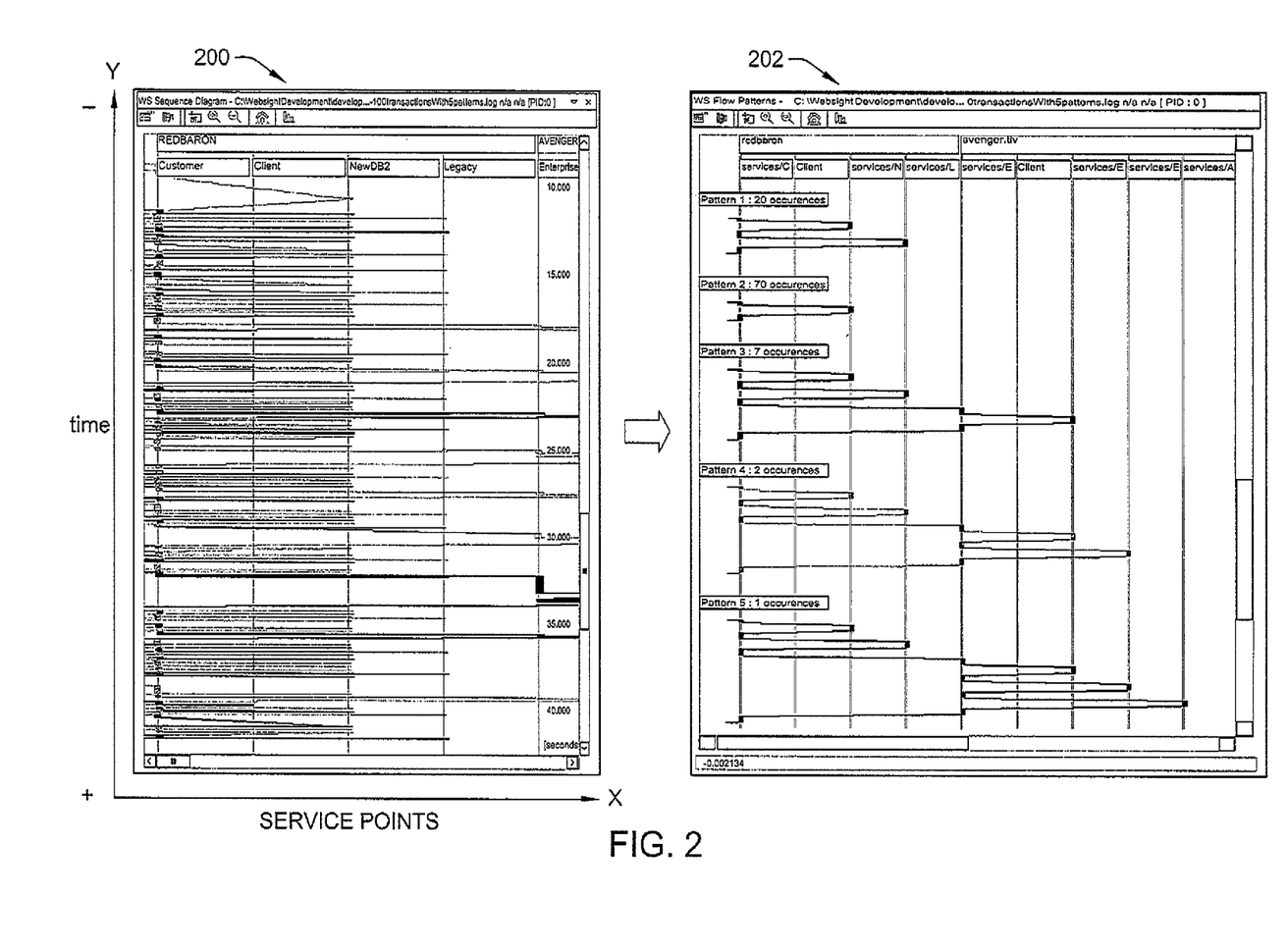
FIG. 2 is a sequence diagram illustrating a plurality of exemplary transactions and a plurality of patterns extracted therefrom.

For example, FIG. 2 is a sequence diagram illustrating a plurality of exemplary transactions 200 (i.e., on the left-hand side) and a plurality of patterns 202 extracted therefrom (i.e., on the right-hand side). In the embodiment illustrated, the plurality of transactions 200 comprises a sequence of one hundred Web Services calls. Points along the x axis represent service points, while points along the y axis represent time (moving downward). As illustrated, the one hundred transactions 200 may be reduced to a group of transaction patterns 202. In the illustrated embodiment, one hundred transactions 200 are reduced to five transaction patterns 202.

Such capability may be especially useful in the eyes of business owners (who may analyze patterns to verify the correctness of a business process or to identify trends in business activities), information technology (IT) architects (who may analyze patterns to identify how different IT resources interact or to identify system bottlenecks), Web Services developers (who may analyze patterns to identify frequently occurring patterns and outliers relating to resource consumption) and Web Services testers (who may analyze patterns rather than test every transaction in a Web Services configuration).

As described above, Web Services transactions may be classified as belonging to a defined transaction pattern according to a plurality of criteria. This can help in quickly analyzing the Web Services configuration for performance analysis, debugging and program understanding. For example, in one embodiment, given a metric relating to either a node or an edge, all transactions more than x standard deviations from the norm may be classified as outliers. Thus, if resource utilization at a node is more than x standard deviations above or below the norm, this may indicate an abnormal execution of the service and may be chosen automatically for investigation. In another embodiment, given a metric relating to either a node or an edge, x transactions falling farthest from the norm may be selected for further investigation.

In another embodiment, a historical representative transaction may be used as a classification mechanism. For example, if a historical set of representative transactions is used as a collection of "seeds" for patterns, then completed transactions can be classified as having characteristics associated with the historical representative transaction. Thus, a current transaction could be classified as nominally "normal" if a metric associates the current transaction with a representative transaction that is considered normal (or, conversely, classified as "abnormal" with needed remediation if the metric associated the current transaction with a historical error representative transaction).

In another embodiment, correlation and statistical mechanisms are implemented to identify abnormal transaction patterns. For example, collections of transactions could be classified as probable errors if an identified pattern represents only one or a few executed transactions. In another embodiment, correlation techniques employing data correlations, header correlations or temporal correlations are used to associate multiple singleton or low frequency patterns. For example, consider the instance in which an executing transaction triggers an error during a unit of work; the error is handled and processing continues. The error handling may break the correlation chain used for associating the parts of the complete transaction. In such cases, parts of the complete transaction chain may appear distributed between multiple singleton or low frequency patterns. If such patterns appear to be temporally close or share significant data, meta-data or attributes, the analysis system could suggest aggregation of the associated parts into another identified pattern.

Figure 5:
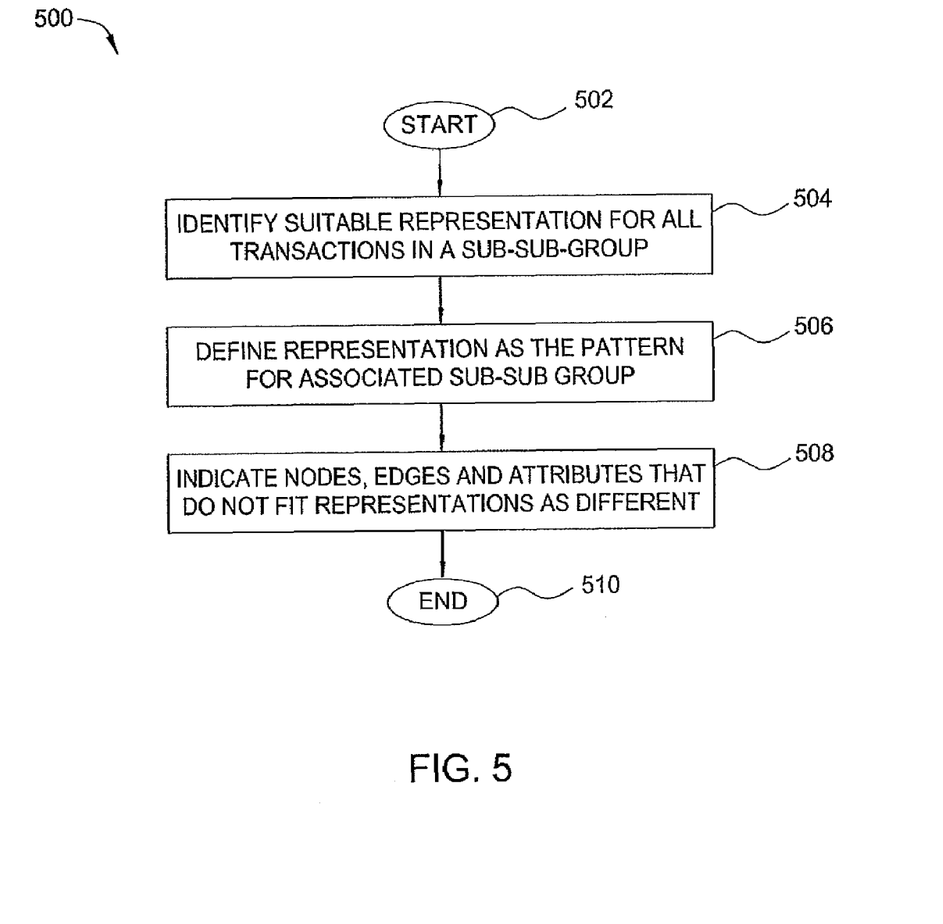
FIG. 5 is a flow diagram illustrating one embodiment of a method for defining a transaction pattern, according to the present invention.

FIG. 5 is a flow diagram illustrating one embodiment of a method 500 for defining a transaction pattern (e.g., in accordance with step 112 of the method 100), according to the present invention. The method 500 is initialized in step 502 and proceeds to step 504, where the method 500 identifies a suitable representation for all transactions in a sub-sub-group. In one embodiment (e.g., where all of the attributes of all of the transactions in the sub-sub-group are identical), the transaction pattern is defined by selecting one transaction from the sub-sub-group as a representative.

In another embodiment (e.g., where all of the attributes of all of the transactions in the sub-sub-group are not identical), a suitable representation is defined by producing a new set of nodes, edges and attributes that is as similar as possible to the transactions in the sub-sub-group. In one embodiment, this new set of nodes, edges and attributes is produced by first using a node, an edge or an attribute that was used as a matching criterion for the sub-sub-group as a new representation. For example, if a matching criterion was that corresponding nodes should have identical PortTypes, the PortType value may be used to label the node. Then, for each node, edge or attribute that was not a matching criterion, a common denominator is found. For example, a commonality may be extracted between two nodes, edges or attributes based on names (e.g., getOrderShoe+getOrderStock->getOrderS*), PortType, or symbolic variables (e.g., [a,a,a,b,a,b] and [c,c,c,d,c,d] produces [x,x,x,y,x,y]).

In step 506, the method 500 defines the representation as the pattern for the sub-sub-group. In one embodiment, this step includes adding information to the representation that aggregates data (e.g., minima, maxima, averages, standard deviations, etc.) from the transactions that are represented.

The method 500 then proceeds to step 508 and indicates all nodes, edges and attributes for which a similar representation can not be found as different. The method 500 then terminates in step 510.

In one embodiment, different patterns produced in accordance with the present invention are visualized together, for example for the purposes of comparison. These different patterns are input into a method similar to the method 100 in order to identify the similarities and differences between the patterns. In such an instance, matching criteria for nodes and/or edges may be relaxed to facilitate comparison.

Figure 6:
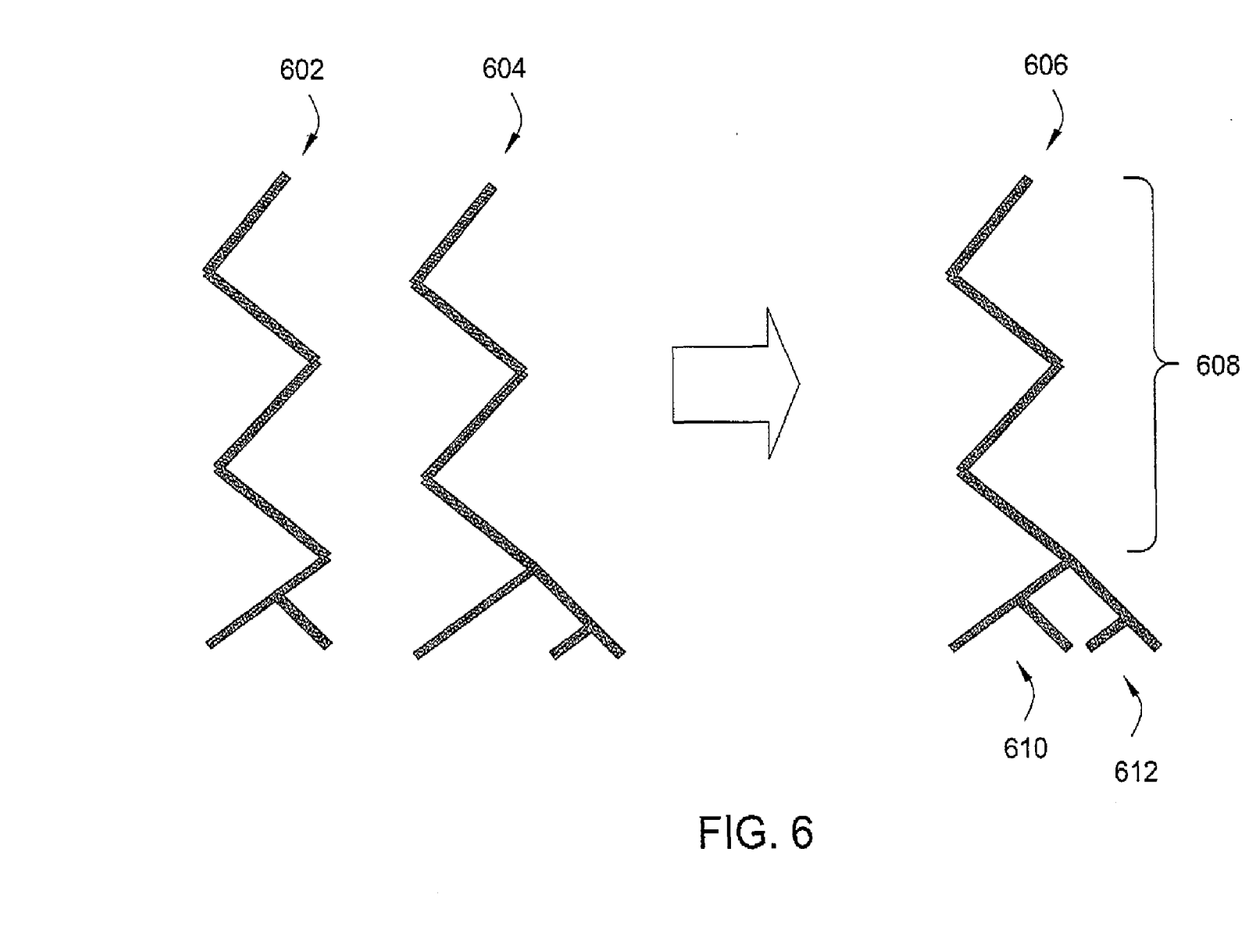
FIG. 6 is a diagram illustrating a manner in which first and second similar transaction patterns and may be compared, according to the present invention.

FIG. 6 is a diagram illustrating a manner in which first and second similar transaction patterns 602 and 604 may be compared, according to the present invention. A first portion 608 of the resulting pattern 606 illustrates a common pattern; however, second and third portions 610 and 612 of the resulting pattern 606 illustrate the differences in the first and second transaction patterns 602 and 604.

Patterns extracted and visualized in accordance with the method 100 may be selected for comparison (of the representative transactions) in a system composed of a collection of services. For example, in one embodiment, code is generated to produce and execute a selected transaction pattern. In another embodiment, tools for performing re-play of a transaction pattern (and for verifying a match or equivalency of the result) are implemented. In another embodiment still, each message in a transaction pattern is "decorated" with data, meta-data or attributes such that the service invocations will not have undesirable side effects when called with the selected transaction pattern. In yet another embodiment, representative transactions are obtained historically to provide test data with known coverage for new or modified Web Services systems that are designed to be upward compatible with the historical Web Services system.

In one embodiment, in order to find a metric of similarity between two or more transaction patterns (e.g., where the goal may be to find trends and outliers in a group of similar transactions that belong to one or more patterns), one classifies individual transactions in the context of a group of transactions, using either user-supplied metrics or pre-defined metrics for classification. In one embodiment, a selected metric is applied to the entire collection of data (e.g., data and meta-data) derived from transactions and used to compute a representative transaction that has the shortest mean square distance from all transactions in the collection of data. Then, one or more individual transactions are classified based on their distances (using either the same metric or a different metric) from the representative transaction. In one embodiment, the data and/or meta-data is collected from either the operation of a software system or synthesized to be representative of software systems.

In one embodiment, relevant metrics are related to resources and include, but are not limited to, resources that are consumed based on or are derived from metering data (e.g., as returned by a metering service or other metering system), resources that are consumed based on or are derived from monitoring data (e.g., as returned by a monitoring service or other monitoring system), resources that are consumed based on or are derived from analysis of communications traffic (e.g., message bodies, headers, trailers, attachments, added attributes or other message content) and resources that are computed from any combination of these sources.

In another embodiment, relevant metrics are related to latency and include temporal latency (e.g., resulting from business logic execution, network execution of logic unrelated to the business logic such as in-line monitoring, or calls to services outside of the Web Services system under analysis). In one embodiment, the primary source of latency data is computed based on time-stamps obtained during Web Services monitoring. In another embodiment, the latency data may include, or even be limited to, latency data taken from other sources.

In yet another embodiment, relevant metrics are combined metrics that include architectural approaches frequently applied in Web Services designs. For example, one approach is to provide equivalent choices for execution of an individual step in a sequence of steps comprising a Web Services transaction. In such cases, a clearer representation of the overall logic flow can be obtained by applying a metric that treats all equivalent services as a single instance by collapsing the corresponding metrics into a single representation used for all equivalent services. For example, if there are three tax computation services, T1, T2 and T3, and there is a derivable set of equivalent resource metrics R1, R2 and R3, then a valuable representation can be obtained by collapsing [T1, R1], [T2, R2] and [T3, R3] into [T, R].

Figure 7:
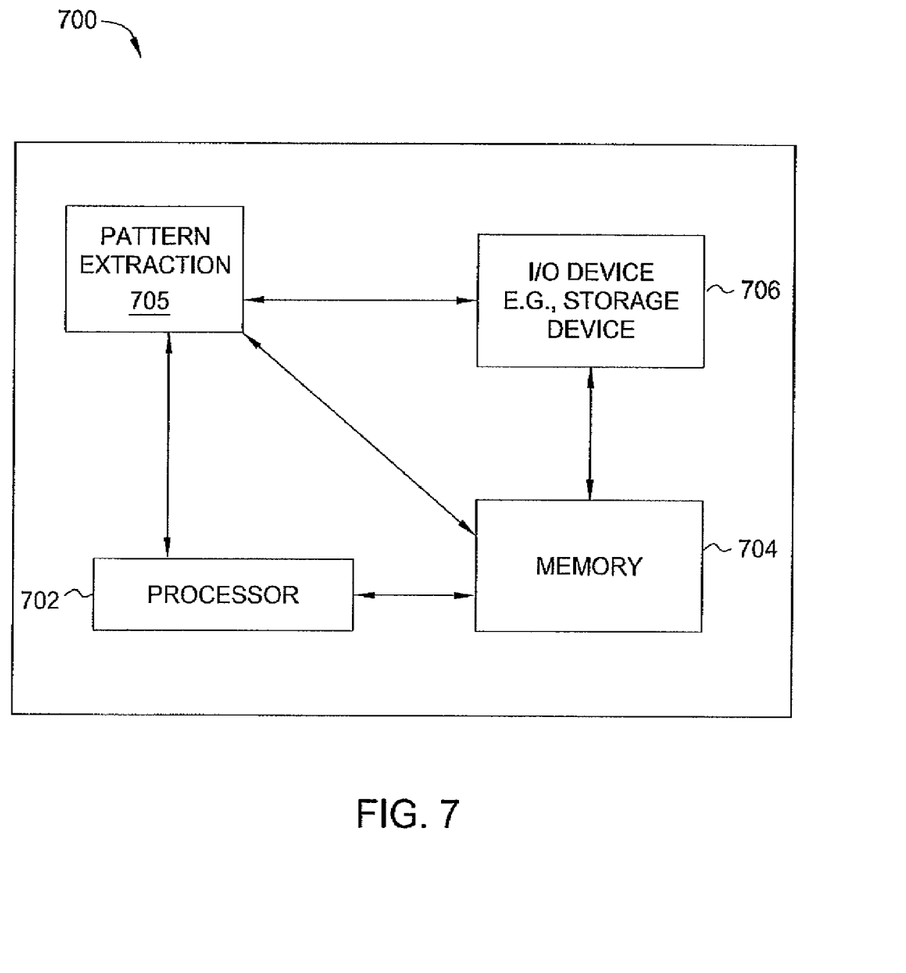
FIG. 7 is a high level block diagram of the pattern extraction method that is implemented using a general purpose computing device.

FIG. 7 is a high level block diagram of the pattern extraction method that is implemented using a general purpose computing device 700. In one embodiment, a general purpose computing device 700 comprises a processor 702, a memory 704, a pattern extraction module 705 and various input/output (I/O) devices 706 such as a display, a keyboard, a mouse, a modem, and the like. In one embodiment, at least one I/O device is a storage device (e.g., a disk drive, an optical disk drive, a floppy disk drive). It should be understood that the pattern extraction module 705 can be implemented as a physical device or subsystem that is coupled to a processor through a communication channel.

Alternatively, the pattern extraction module 705 can be represented by one or more software applications (or even a combination of software and hardware, e.g., using Application Specific Integrated Circuits (ASIC)), where the software is loaded from a storage medium (e.g., I/O devices 706) and operated by the processor 702 in the memory 704 of the general purpose computing device 700. Thus, in one embodiment, the pattern extraction module 705 for extracting and visualizing execution patterns from Web Services described herein with reference to the preceding Figures can be stored on a computer readable medium or carrier (e.g., RAM, magnetic or optical drive or diskette, and the like).

Thus, the present invention represents a significant advancement in the field of Web Services. A method and apparatus are provided that enable the efficient identification and definition of patterns in Web Services transactions. This capability facilitates operations including performance analysis, debugging and program understanding by allowing a user to analyze and understand system conditions without having to review hundreds or thousands of sets of individual data While foregoing is directed to the preferred embodiment of the present invention, other and further embodiments of the invention may be devised without departing from the basic scope thereof, and the scope thereof is determined by the claims that follow.

The invention claimed is:

1. A method for extracting a pattern from data relating to a plurality of messages exchanged in accordance with a Web Services configuration, the pattern being representative of a plurality of transactions executed in accordance with the Web Services configuration, the method comprising:

representing each of the plurality of transactions as a separate graph, such that a plurality of graphs is produced, wherein the representing comprises:
reducing one or more repetitive sequences occurring in said plurality of transactions to produce one or more reduced sequences, where the one or more reduced sequences are represented in the plurality of graphs; and identifying commonalities among the plurality of graphs, wherein said identifying comprises:
dividing the plurality of graphs into one or more subsets, where all graphs within a given sub-set one of the one or more subsets share structural similarities; and dividing at least one of the one or more sub-sets into two or more sub-sub-sets, where all graphs within a given one of the two or more sub-sub-sets share at least one of:

at least one node attribute or at least one edge attribute, wherein at least one of: the representing or the identifying is performed using a processor.

2. The method of claim 1, wherein all graphs within a given one of the plurality of sub-sets are isomorphic.

3. The method of claim 1, wherein the at least one node attribute is a service point or is a function of a service point.

4. The method of claim 1, wherein the at least one node attribute is a port type or is a function of a port type.

5. The method of claim 1, wherein the at least one node attribute is a machine or is a function of a machine.

6. The method of claim 1, wherein the at least one node attribute is node performance data or is a function of node performance data.

7. The method of claim 1, wherein the at least one edge attribute is an operation or a function of an operation.

8. The method of claim 1, wherein the at least one edge attribute is a message name or a function of a message name.

9. The method of claim 1, wherein the at least one edge attribute is a message or a function of a message type.

10. The method of claim 1, wherein the at least one edge attribute is an error type or a function of an error type.

11. The method of claim 1, wherein the at least one edge attribute is performance data or a function of performance data.

12. The method of claim 1, wherein the at least one edge attribute is a message content or a function of a message content.

13. The method of claim 1, wherein the at least one node attribute or the at least one edge attribute is deemed to match across graphs in an associated one of the two or more sub-sub-sets in accordance with a predefined matching criterion.

14. The method of claim 1, wherein the at least one node attribute or the at least one edge attribute is deemed to match across graphs in an associated one of the two or more sub-sub-sets in accordance with a predefined matching criterion.

15. The method of claim 1, further comprising:
defining at least one pattern in accordance with at least one of the two or more sub-sub-sets.

16. The method of claim 15, wherein the defining comprises:
identifying a suitable representation for all transactions represented within a given one of the two or more sub-sub-sets; and
defining the suitable representation as the at least one pattern.

17. A computer readable storage device containing an executable program for extracting a pattern from data relating to a plurality of messages exchanged in accordance with a Web Services configuration, the pattern being representative of a plurality of transactions executed in accordance with the Web Services configuration, where the program performs steps comprising:
representing each of the plurality of transactions as a separate graph, such that a plurality of graphs is produced, wherein the representing comprises:
reducing one or more repetitive sequences occurring in said plurality of transactions to produce one or more reduced sequences, where the one or more reduced sequences are represented in the plurality of graphs; and
identifying commonalities among the plurality of graphs, wherein said identifying comprises:
dividing the plurality of graphs into one or more sub-sets, where all graphs within a given sub-set one of the one or more subsets share structural similarities; and
dividing at least one of the one or more sub-sets into two or more sub-sub-sets, where all graphs within a given one of the two or more sub-sub-sets share at least one of:
at least one node attribute or at least one edge attribute.

18. Apparatus for extracting a pattern from data relating to a plurality of messages exchanged in accordance with a Web Services configuration, the pattern being representative of a plurality of transactions executed in accordance with the Web Services configuration, the apparatus comprising:
means for representing each of the plurality of transactions as a separate graph, such that a plurality of graphs is produced, wherein the means for representing comprises:
means for reducing one or more repetitive sequences occurring in said plurality of transactions to produce one or more reduced sequences, where the one or more reduced sequences are represented in the plurality of graphs; and
means for identifying commonalities among the plurality of graphs, wherein said means for identifying comprises:
means for dividing the plurality of graphs into one or more sub-sets, where all graphs within a given sub-set one of the one or more subsets share structural similarities; and
means for dividing at least one of the one or more sub-sets into two or more sub-sub-sets, where all graphs within a given one of the two or more sub-sub-sets share at least one of: at least one node attribute or at least one edge attribute.

* * * * *